(12) United States Patent
Beck

(10) Patent No.: US 7,896,295 B2
(45) Date of Patent: Mar. 1, 2011

(54) COUPLER FOR CABLE TROUGH

(75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 897 days.

(21) Appl. No.: 11/677,203

(22) Filed: Feb. 21, 2007

(65) Prior Publication Data

US 2008/0199140 A1  Aug. 21, 2008

(51) Int. Cl.
*F16L 3/22*    (2006.01)
(52) U.S. Cl. .......................... 248/68.1; 248/49; 52/11; 52/220.5; 385/134
(58) Field of Classification Search .................. 385/134, 385/136; 403/387, 321; 248/222.11, 222.12, 248/222.51, 222.52, 223.31, 316.2; 52/11, 52/220.5
See application file for complete search history.

(56) References Cited

U.S. PATENT DOCUMENTS

| | | | |
|---|---|---|---|
| 2,316,166 A | 4/1943 | Huguelet |
| 2,360,159 A | 10/1944 | Peck |
| 2,741,499 A | 4/1956 | Kussmaul |
| 2,821,154 A | 1/1958 | Tennison, Jr. |
| 2,823,056 A | 2/1958 | DiMeo et al. |
| 2,834,622 A | 5/1958 | Reeves |
| 2,880,887 A | 4/1959 | McClurg |
| 2,891,750 A | 6/1959 | Bergquist |
| 3,022,972 A | 2/1962 | Bunston |
| 3,042,351 A | 7/1962 | Du Bois |
| 3,188,030 A | 6/1965 | Fischer |
| 3,351,699 A | 11/1967 | Merckle |
| 3,370,121 A | 2/1968 | Merckle |
| 3,457,598 A | 7/1969 | Mariani |
| 3,471,629 A | 10/1969 | O'Leary |
| 3,493,917 A | 2/1970 | Glowacz |
| 3,603,625 A | 9/1971 | Cottrell et al. |
| 3,782,420 A | 1/1974 | Kolb et al. |
| 3,875,618 A | 4/1975 | Schuplin |
| 3,915,420 A | 10/1975 | Norris |
| 4,099,749 A | 7/1978 | van Vliet |
| 4,305,236 A | 12/1981 | Williams |

(Continued)

FOREIGN PATENT DOCUMENTS

DE    3636412 A1    4/1988

(Continued)

OTHER PUBLICATIONS

Exhibit A, DITEL, Inc.; DITEL UPL-1000/UPT-1000/Corner Cable Guides; product information, 2 pages, © 1986.

(Continued)

*Primary Examiner*—Gwendolyn Baxter
(74) *Attorney, Agent, or Firm*—Merchant & Gould P.C.

(57) ABSTRACT

Elements, couplers, systems, and methods for joining two or more trough members. A locking element for a coupler of a cable trough system can include a main body with an aperture, a shaft extending through the aperture of the main body, the shaft being rotatable with respect to the main body, and a handle member coupled to a first end of the shaft. The locking element also includes a member coupled to a second end of the shaft, and a spring coupled to the main body, the spring rotating the shaft and the member into a locked position.

14 Claims, 12 Drawing Sheets

U.S. PATENT DOCUMENTS

| | | | |
|---|---|---|---|
| 4,854,665 | A | 8/1989 | Gagnon |
| 4,953,030 | A * | 8/1990 | Seo .......................... 348/375 |
| 4,954,015 | A | 9/1990 | McGowan |
| 5,035,092 | A | 7/1991 | Brant |
| 5,038,528 | A | 8/1991 | Brant |
| 5,067,678 | A | 11/1991 | Henneberger et al. |
| 5,078,530 | A | 1/1992 | Kim |
| 5,100,221 | A | 3/1992 | Carney et al. |
| 5,134,250 | A | 7/1992 | Caveney et al. |
| 5,142,606 | A | 8/1992 | Carney et al. |
| 5,161,580 | A | 11/1992 | Klug |
| 5,316,243 | A | 5/1994 | Henneberger |
| D348,651 | S | 7/1994 | Henneberger |
| 5,469,893 | A | 11/1995 | Caveney et al. |
| 5,547,307 | A | 8/1996 | Decore et al. |
| 5,617,678 | A | 4/1997 | Morandin et al. |
| 5,720,567 | A | 2/1998 | Rinderer |
| 5,752,781 | A | 5/1998 | Haataja et al. |
| 5,753,855 | A | 5/1998 | Nicoli et al. |
| 5,792,993 | A | 8/1998 | Rinderer |
| D402,262 | S | 12/1998 | Scherer et al. |
| D402,263 | S | 12/1998 | Scherer et al. |
| 5,884,887 | A * | 3/1999 | Garelick et al. ............. 248/423 |
| D413,306 | S | 8/1999 | Scherer et al. |
| 5,995,699 | A | 11/1999 | Vargas et al. |
| 5,998,732 | A | 12/1999 | Caveney et al. |
| D419,962 | S | 2/2000 | Caveney |
| 6,037,543 | A | 3/2000 | Nicoli et al. |
| D430,543 | S | 9/2000 | Rohder |
| 6,126,122 | A | 10/2000 | Ismert |
| 6,143,984 | A | 11/2000 | Auteri |
| 6,188,024 | B1 | 2/2001 | Benito-Navazo |
| 6,193,434 | B1 | 2/2001 | Durin et al. |
| D447,737 | S | 9/2001 | Scherer et al. |
| 6,402,418 | B1 | 6/2002 | Durin et al. |
| 6,424,779 | B1 | 7/2002 | Ellison et al. |
| 6,443,320 | B1 * | 9/2002 | Herzog et al. ............... 211/192 |
| 6,450,458 | B1 | 9/2002 | Bernard |
| 6,454,485 | B2 | 9/2002 | Holcomb et al. |
| 6,463,631 | B2 | 10/2002 | Noda |
| 6,476,327 | B1 | 11/2002 | Bernard et al. |
| 6,512,875 | B1 | 1/2003 | Johnson et al. |
| 6,520,192 | B1 | 2/2003 | Lo |
| 6,523,791 | B2 | 2/2003 | Bernard et al. |
| 6,603,073 | B2 | 8/2003 | Ferris |
| 6,634,605 | B2 | 10/2003 | Bernard et al. |
| 6,634,825 | B2 | 10/2003 | Tolkoff et al. |
| 6,709,186 | B2 | 3/2004 | Ferris et al. |
| 6,715,719 | B2 | 4/2004 | Ferris et al. |
| 6,810,191 | B2 | 10/2004 | Ferris et al. |
| 7,029,195 | B2 | 4/2006 | Ferris et al. |
| 7,093,997 | B2 | 8/2006 | Ferris et al. |
| 7,175,137 | B2 | 2/2007 | Ferris et al. |
| 7,246,778 | B2 | 7/2007 | Caveney et al. |
| 7,623,330 | B2 * | 11/2009 | Gallas et al. ................. 361/42 |
| 2002/0006312 | A1 | 1/2002 | Buard |
| 2002/0096606 | A1 | 7/2002 | Bernard et al. |
| 2003/0147690 | A1 | 8/2003 | Ronnquist |
| 2003/0177628 | A1 | 9/2003 | Viklund |
| 2003/0183731 | A1 | 10/2003 | Ferris et al. |
| 2003/0183732 | A1 | 10/2003 | Nault et al. |
| 2004/0159750 | A1 | 8/2004 | Ferris et al. |
| 2006/0210356 | A1 | 9/2006 | Ferris et al. |
| 2006/0261240 | A1 | 11/2006 | Ferris et al. |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | 02/086576 A1 | 10/2002 |
| WO | 2004/006400 A1 | 1/2004 |

OTHER PUBLICATIONS

Exhibit B, ADC Telecommunications, Inc.; FiberGuide™, Fiber Management System, 6 pages front and back printed, 16/1989.
Exhibit C, Warren & Brown Technologies Pty. Ltd., Fibre Optic Management Systems, Component Selection Guide, 19 pages of product information. Source: www.warrenandbrown.com.au (admitted prior art as of the filing date).
Exhibit D, Panduit Network Connectivity Group, FiberRunner™ 6×4 Routing System Product Brochure, 2 pages, © Panduit Corp. 2000.
Exhibit E, Panduit Corp. FiberRunner™ 4×4 Quiklock™ Coupler (FRBC4×4) Customer Drawing, 1 page, Jul. 13, 2001.
Exhibit F, Panduit Corp. FiberRunner™ 6×4 Quiklock™ Coupler (FRBC6×4) Customer Drawing, 1 page, May 10, 2000.
Exhibit G, Panduit Corp. FiberRunner™ 12×4 Quiklock™ Coupler (FRBC12×4) Customer Drawing, 1 page, Jan. 3, 2001.
Exhibits H-Y, Photographs of various Panduit products (admitted prior art as of the filing date).
U.S. Appl. No. 11/425,625, filed Jun. 21, 2006.
U.S. Appl. No. 11/677,174, filed Feb. 21, 2007.
U.S. Appl. No. 11/677,181, filed Feb. 21, 2007.
U.S. Appl. No. 11/677,184, filed Feb. 21, 2007.
U.S. Appl. No. 11/677,188, filed Feb. 21, 2007.
U.S. Appl. No. 11/677,193, filed Feb. 21, 2007.
U.S. Appl. No. 11/677,200, filed Feb. 21, 2007.

* cited by examiner

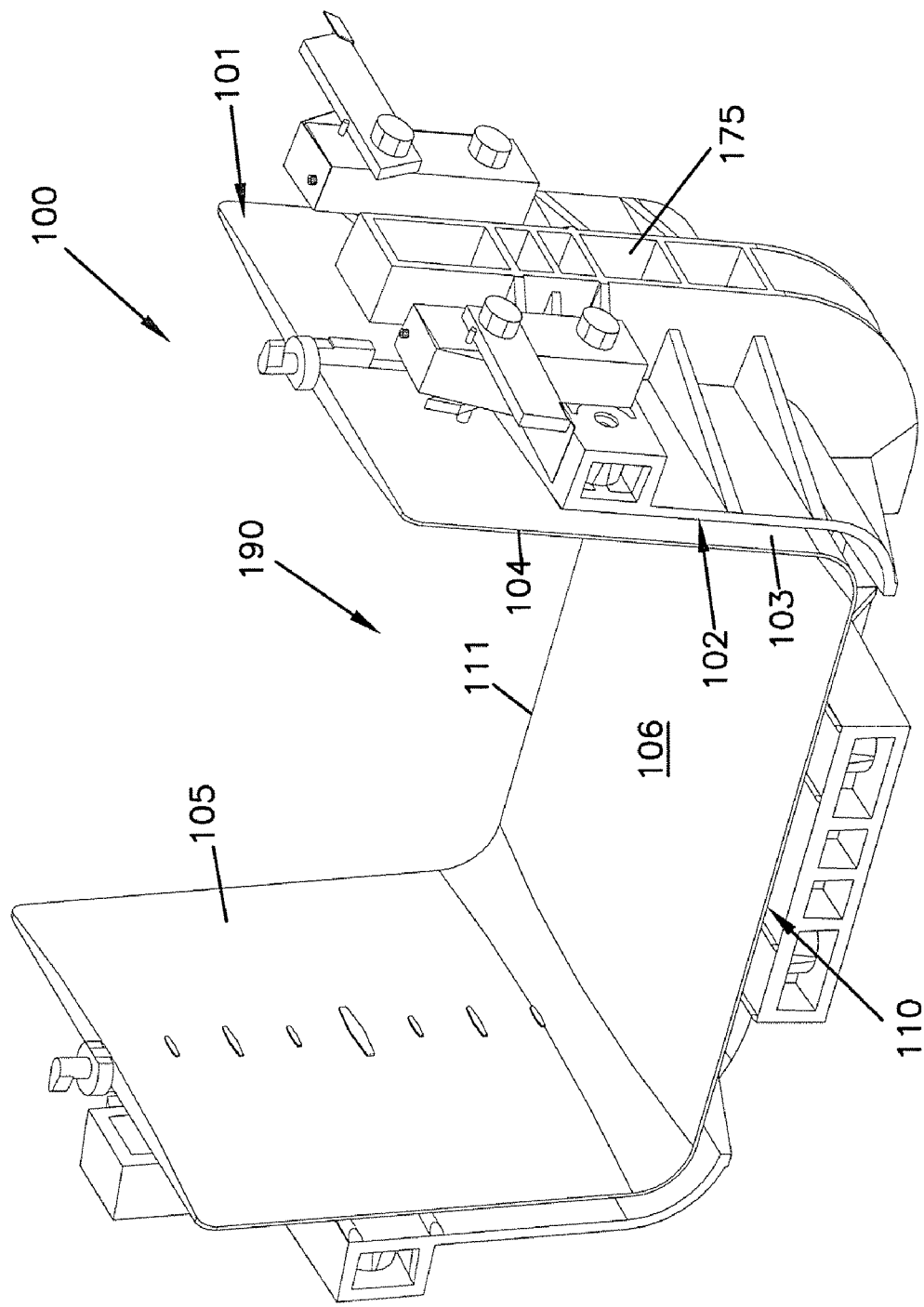

COUPLER FOR CABLE TROUGH

RELATED APPLICATIONS

This application is related to the following applications: U.S. patent application Ser. No. 11/677,181; U.S. patent application Ser. No. 11/677,184; U.S. patent application Ser. No. 11/677,188; U.S. patent application Ser. No. 11/677,193; U.S. patent application Ser. No. 11/677,200; and U.S. patent application Ser. No. 11/677,174; all of which were filed on even date herewith and are incorporated by reference herein.

TECHNICAL FIELD

Embodiments disclosed herein relate to systems for the management and routing of telecommunication cables, and, more particularly, to couplers for joining trough members.

BACKGROUND

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; 5,752,781; 6,709,186; and 6,715,719 teach cable routing systems that include a plurality of trough members and couplers.

Various concerns arise with the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected and reconnected.

SUMMARY

Embodiments disclosed herein relate to a system for the management and routing of telecommunication cables, and, more particularly, to elements, couplers, systems, and methods for joining two or more trough members.

One aspect relates to a locking element for a coupler of a cable trough system, the locking element including a main body defining an aperture, a shaft extending through the aperture of the main body, the shaft being rotatable with respect to the main body, and a handle member coupled to a first end of the shaft. The locking element also includes a member coupled to a second end of the shaft, and a spring coupled to the main body, the spring rotating the shaft and the member into a locked position.

DESCRIPTION OF THE DRAWINGS

FIG. 2 is a perspective view of an embodiment of a coupler of the trough system of FIG. 1.

DETAILED DESCRIPTION

As used herein, the terms "couple" and "coupled" mean to join or attach a first element in relation to a second element, whether the attachment is made directly with the second element or indirectly through one or more intermediate components. As used herein, the term "slot" means a space defined by one or more surfaces and can include, without limitation, T-slots, closed slots, flanges, and projections.

Figure 1:
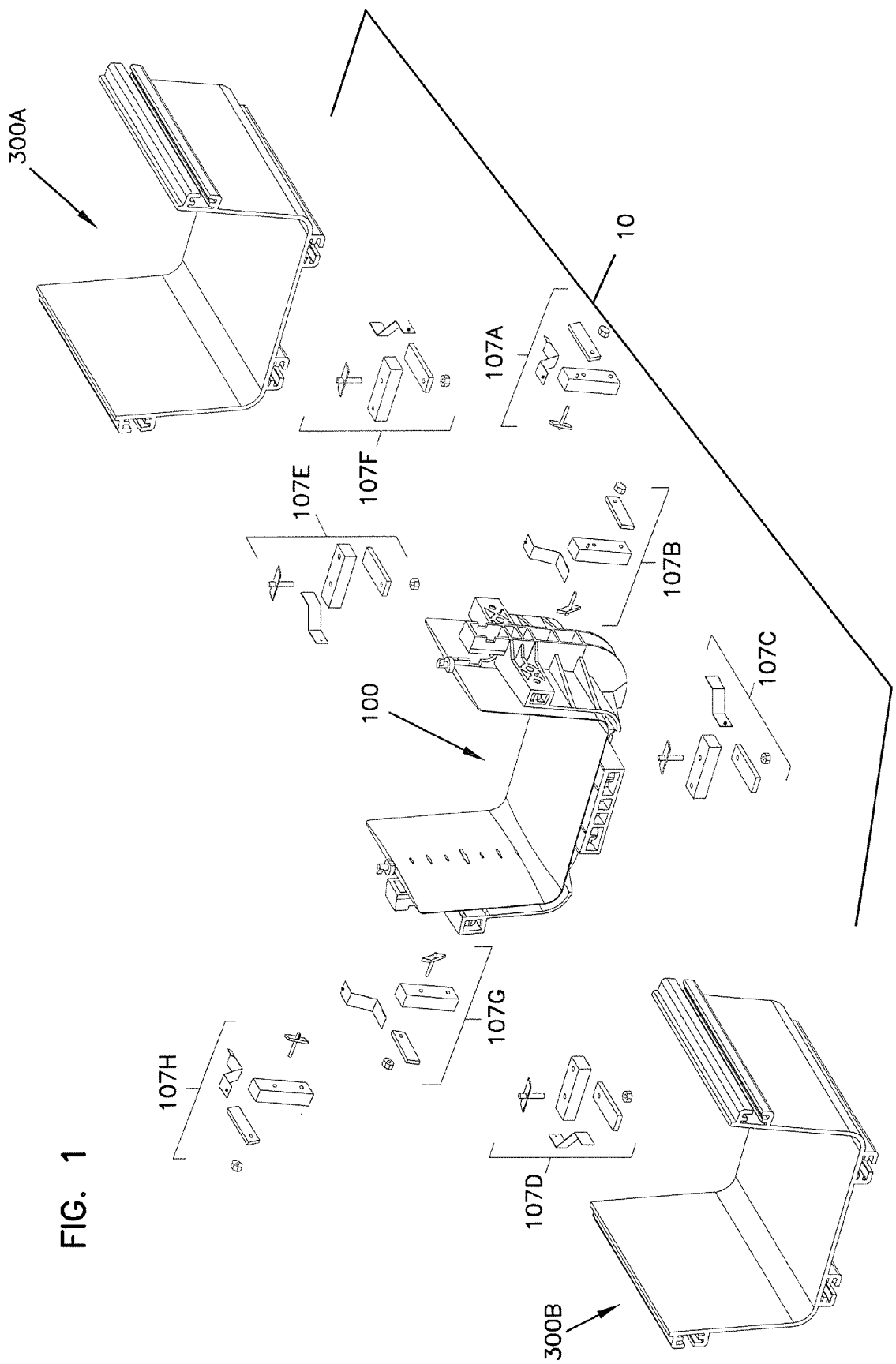
FIG. 1 is a perspective view of an embodiment of a trough system shown in exploded form.
Figure 4:
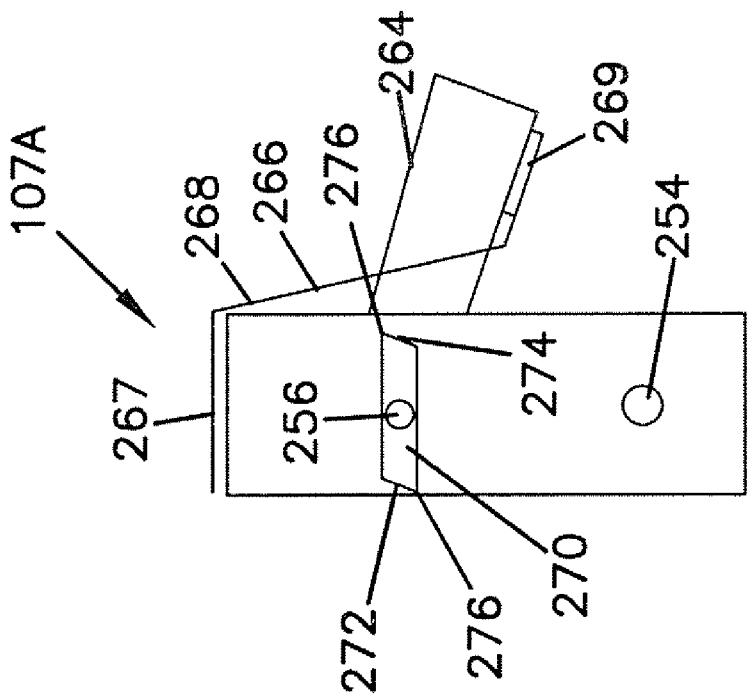
FIG. 4 is a back view of the locking element of FIG. 3.
Figure 3:
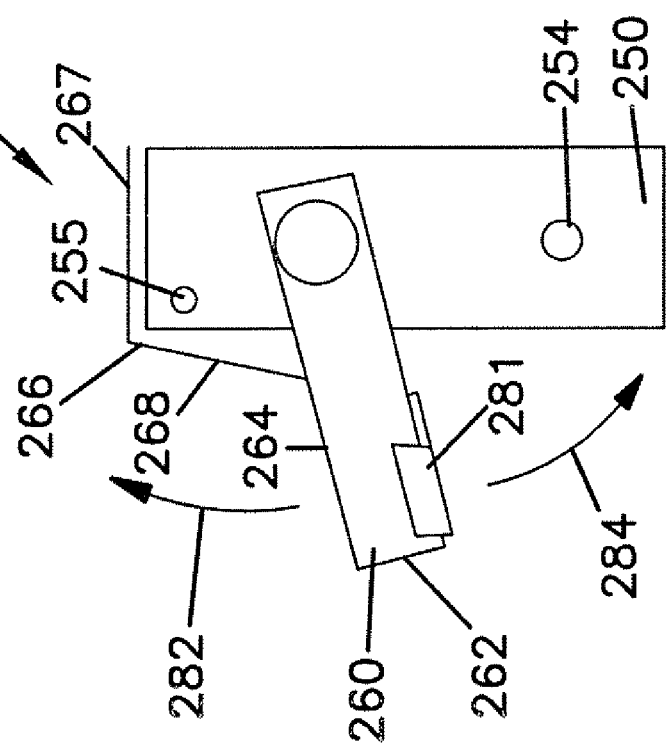
FIG. 3 is a front view of a locking element of the trough system of FIG. 1.
Figure 5:
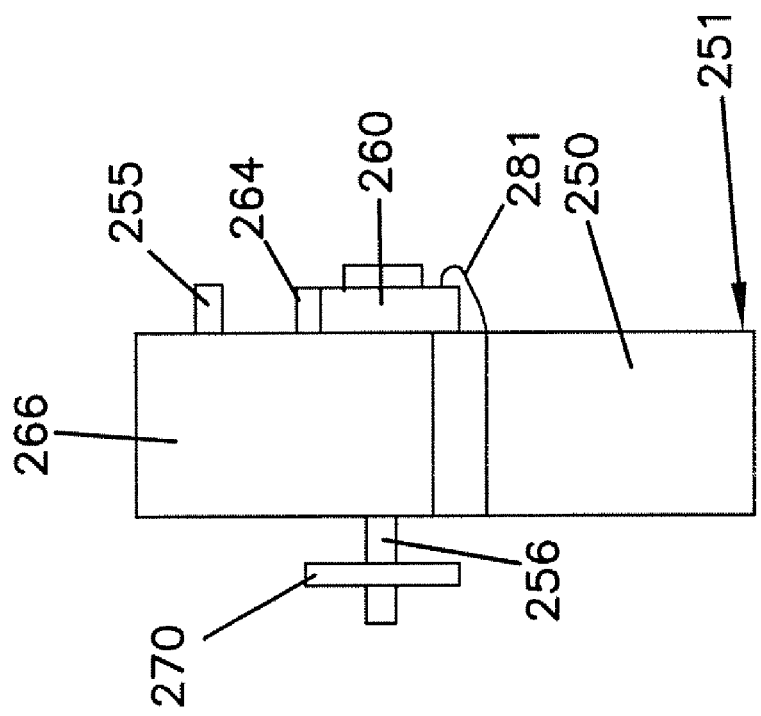
FIG. 5 is an end view of the locking element of FIG. 3.

FIG. 1 shows an example trough system 10 including a coupler 100 for interconnecting trough members 300A, 300B. Coupler 100 includes locking elements 107A, 107B, 107C, 107D, 107E, 107F, 107G, 107H to secure the connection between coupler 100 and trough members 300A, 300B.

In addition, coupler 100 can be configured to release the connections between coupler 100 and trough members 300A, 300B. In an example embodiment, locking elements 107A, 107B, 107C, 107D, 107E, 107F, 107G, 107H are tool-less (i.e., do not require the use of a separate tool to couple and uncouple trough members 300A, 300B to coupler 100). However, elements requiring one or more auxiliary tools are also within the scope of the present disclosure.

I. Coupler

As shown in FIG. 2, coupler 100 includes a first guiding surface 101 and a second guiding surface 102 at least partially surrounding first guiding surface 101, as well as a first coupler end 110 and a second coupler end 111. A spacing 103 is defined between first guiding surface 101 and second guiding surface 102. Spacing 103 is sized to receive a trough member (e.g., trough members 300A, 300B) or another trough system component inserted into the spacing 103 in a longitudinal direction 190.

First guiding surface 101 of coupler 100 is generally in the shape of a trough, including a first side wall portion 104 and a second side wall portion 105, as well as a bottom wall portion 106 joining first and second side wall portions 104 and 105. As used herein, the term "trough" means any structure that defines an interior in which an element such as an optical cable can be maintained. Second guiding surface 102 is also in the shape of a trough. A midpoint or midsection 175 divides coupler 100 into first and second halves, and generally surrounds at least a portion of first guiding surface 101.

Referring now to FIGS. 2-5, locking element 107A is described in more detail. Locking element 107A includes a main body 250, a shaft member 256, a handle member 260, and a spring member 266, and a pawl member 270.

Main body 250 includes one or more apertures, such as apertures 252, 254, through which one or more fasteners extend to couple main body 250 to coupler 100. In alternative embodiments, other fasteners can be used to couple main body 250 to coupler 100, such as adhesives. In yet other embodiments, main body 250 can be molded as part of second guiding surface 102.

Main body 250 also includes a pin 255 extending from a surface 251 of main body 250 to limit rotation of handle member 260, as described further below.

Shaft member 256 extends through main body 250 and handle member 260. Pawl member 270 is coupled to an opposite end of shaft member 256. Shaft member 256, handle member 260, and pawl member 270 rotate with respect to main body 250 in directions 282, 284.

Handle member 260 includes a free end 262 that extends from main body 250 so that a user can grasp and rotate handle member 260. As handle member 260 is rotated, pawl member 270 also rotates with handle member 260 and shaft member 256. Pawl member 270 includes first and second ends 272, 274 that form points 276 that are configured to engage trough members 300A, 300B, as described further below. For example, in the embodiment shown, pawl member 270 generally forms a parallelogram shape.

Spring member 266 includes a first portion 267 that is coupled to main body 250, a second portion 268 that extends at a first angle from first portion 267, and a third portion 269 that extends from second portion 268 at second angle. In the example shown, third portion 269 includes a member 281 (see FIGS. 3 and 5) extending from third portion 268 that is positioned to engage free end 262 of handle member 260.

In example embodiments, spring member 266 moves, biases, or forces free end 262 of handle member 260 in direction 282. As handle member 260 rotates in direction 282, a side surface 264 of handle member 260 contacts pin 255 on main body 260 to limit further rotation of handle member 260 in direction 282. This is the locked position for locking element 107A. Handle member 260 can be rotated in direction 284 against spring member 260 from the locked position to an unlocked position, as described further below.

In alternative embodiments, other members can be used to force handle member 260 into the locked position. For example, a torsion spring (such as spring member 466 shown in FIG. 10) can be used.

II. Trough

Figure 6:
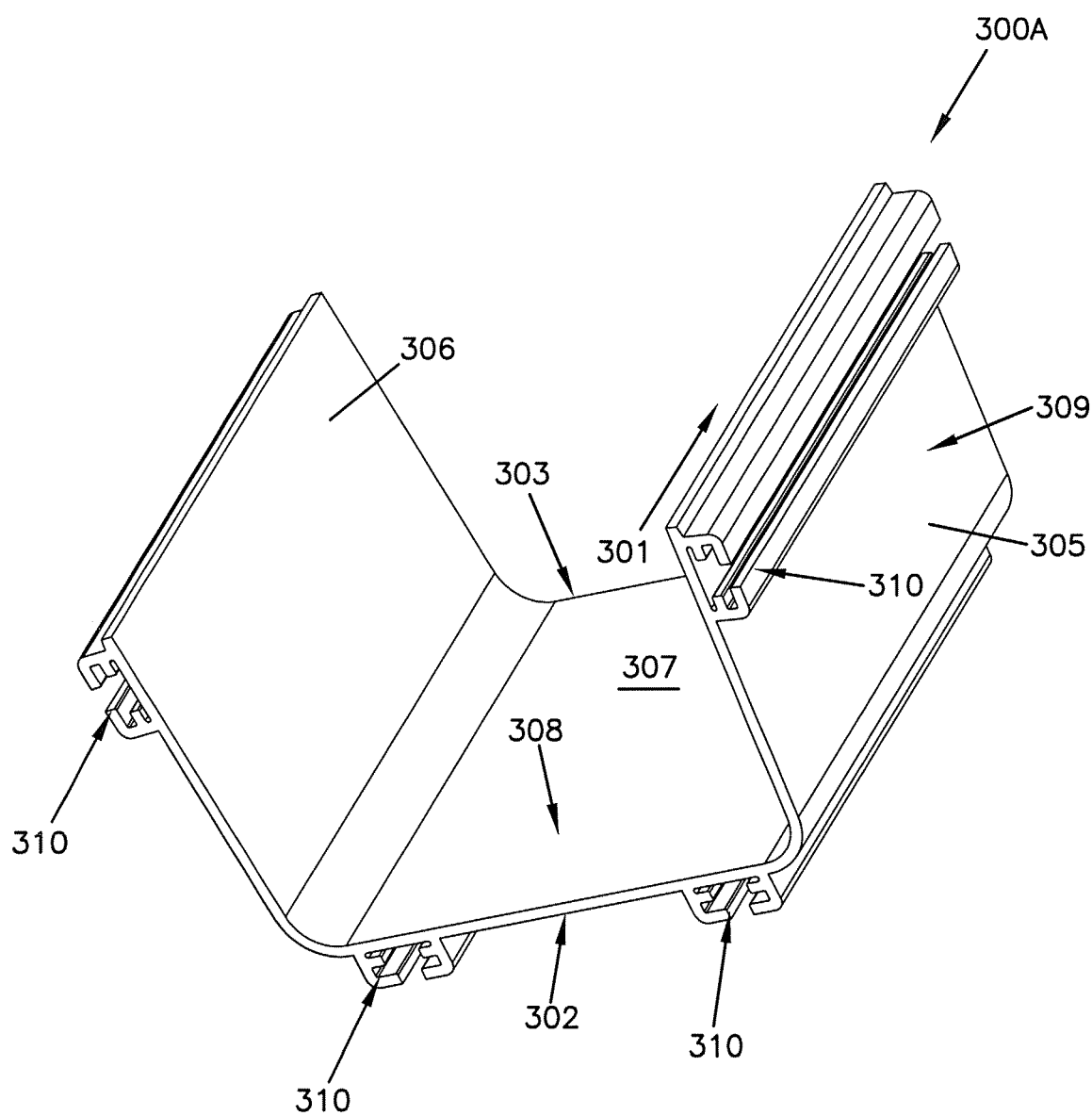
FIG. 6 is a perspective view of an embodiment of a trough member of the trough system of FIG. 1.
Figure 7:
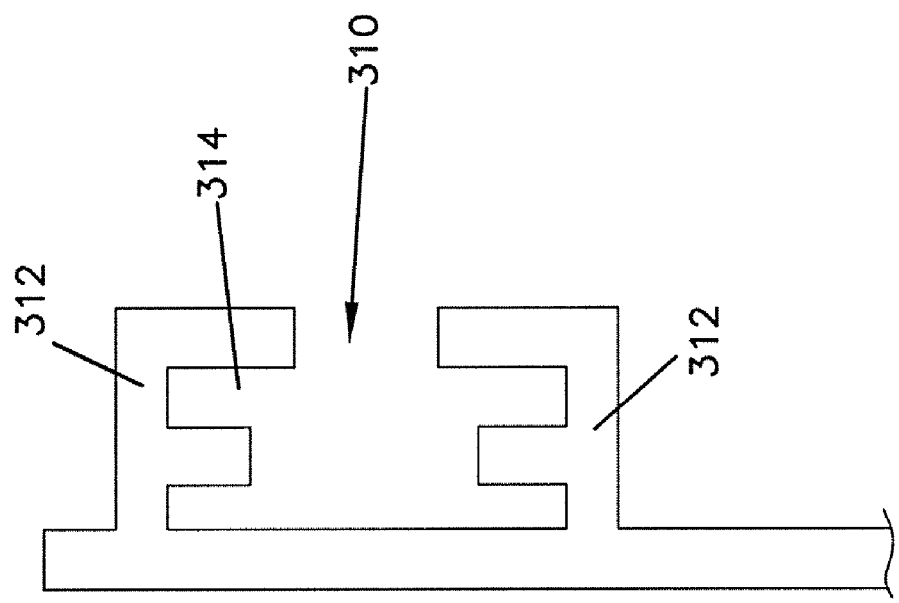
FIG. 7 is a side view of a portion of the trough member of FIG. 6 including a slot.
Figure 8:
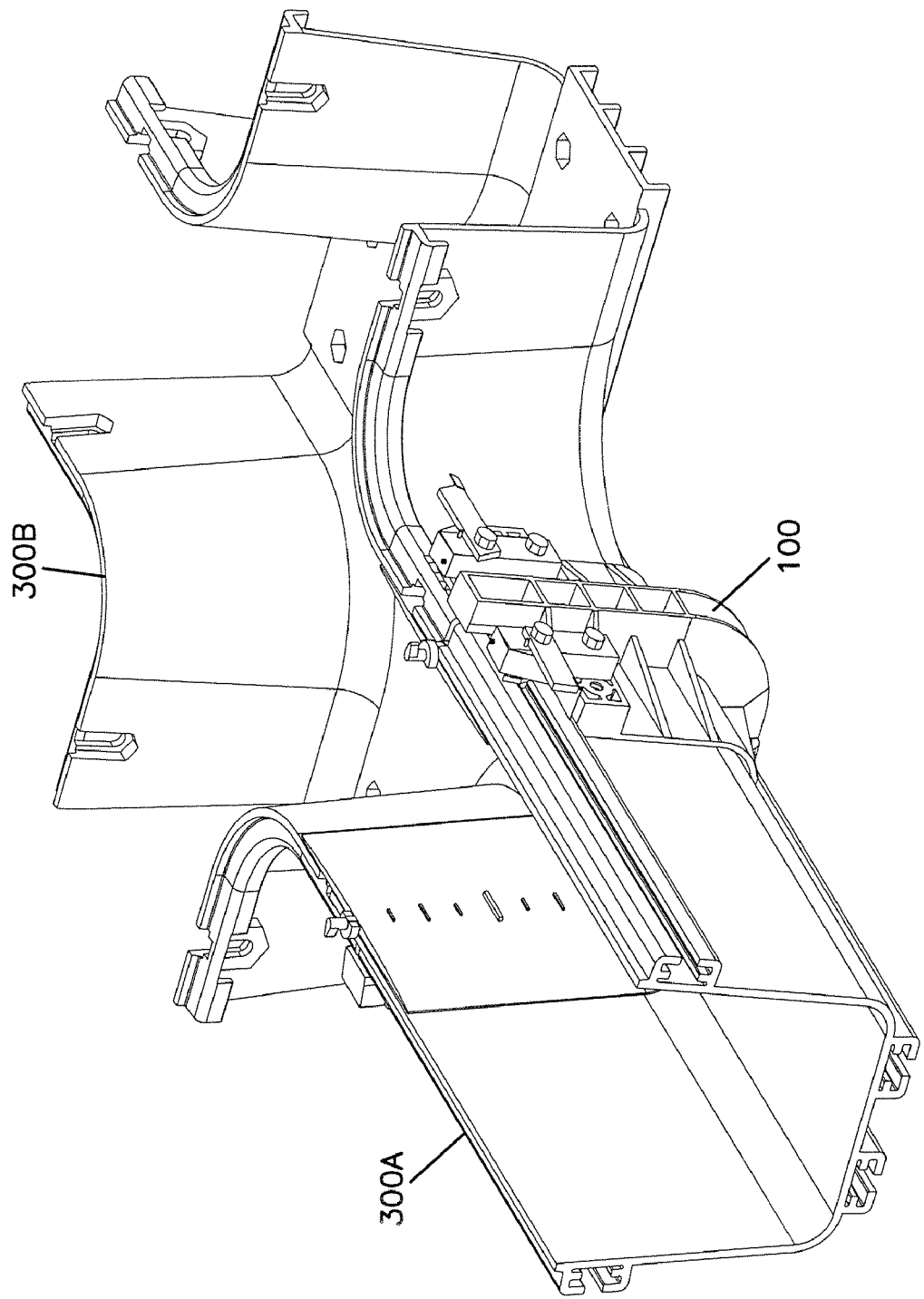
FIG. 8 is a perspective view of another embodiment of a trough system.

Referring now to FIGS. 6 and 7, trough member 300A is shown in more detail. As used herein, the phrase "trough member" is used to refer to any trough, fitting, railway, raceway, or similarly configured component including any number of ends. Although a specific embodiment of a trough member is shown in and described herein, other trough members can also be used.

Trough member 300A includes a first terminal end 302 and a second terminal end 303. Trough member 300A is generally in the shape of a trough including first and second side walls 305, 306 coupled by a bottom wall 307, thereby defining an interior surface 308 and an exterior surface 309. Walls 305, 306, 307 are each generally planar.

The exterior surface 309 define one or more slots 310 on the side walls 305 and 306 and bottom wall 307. Slots 310 extend in a longitudinal direction 301 of the trough member 300A from the first terminal end 302 to the second terminal end 303. In example embodiments, slot 310 is formed by two walls 312 that define a space 314 therebetween. Typically, slots 310 will be provided to correspond to at least one or more of the locking elements on one side of a coupler, as described further below.

Alternative configurations and placement for the slots 310 are also possible. For example, the slots 310 may be T-slots, as shown on the example embodiment of the trough 300A. As used herein, the term "T-slot" means a slot having a narrow access opening and a wider interior region. In addition, the slots 310 may also be flanges or opposing projections. Other configurations are possible. Example slot configurations include two opposing walls that extend in the longitudinal direction 301, although a single surface may also be used. The slots 310 may not extend fully between the terminal ends of the trough member. The placement of the slots on the exterior surface of the trough members may be altered. More or fewer slots may also be provided.

III. System

Referring now to FIGS. 8-11, terminal ends 302, 303 of the trough members 300A, 300B are slidingly engaged in the spacing 103 between the first and second guiding surfaces 101 and 102 of the coupler 100. The thickness of the walls of each of the trough members 300A, 300B, or the distance between the inner and outer surfaces 308, 309, are sized to fit within the spacing 103 of the coupler 100. The coupler 100 overlaps the terminal ends 302, 303 of each of the trough members 300A, 300B to form the coupling, the overlap defining an overlap region.

Figure 9:
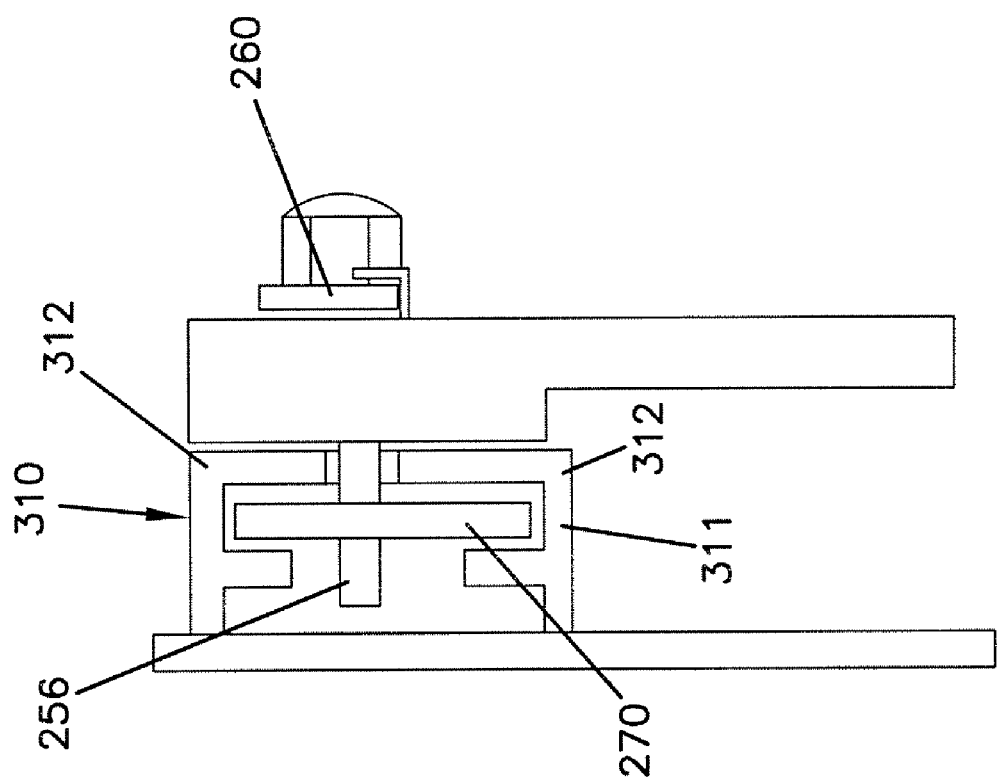
FIG. 9 is a side view of a portion of embodiments of a coupler and a trough member of the trough system of FIG. 8.
Figure 10:
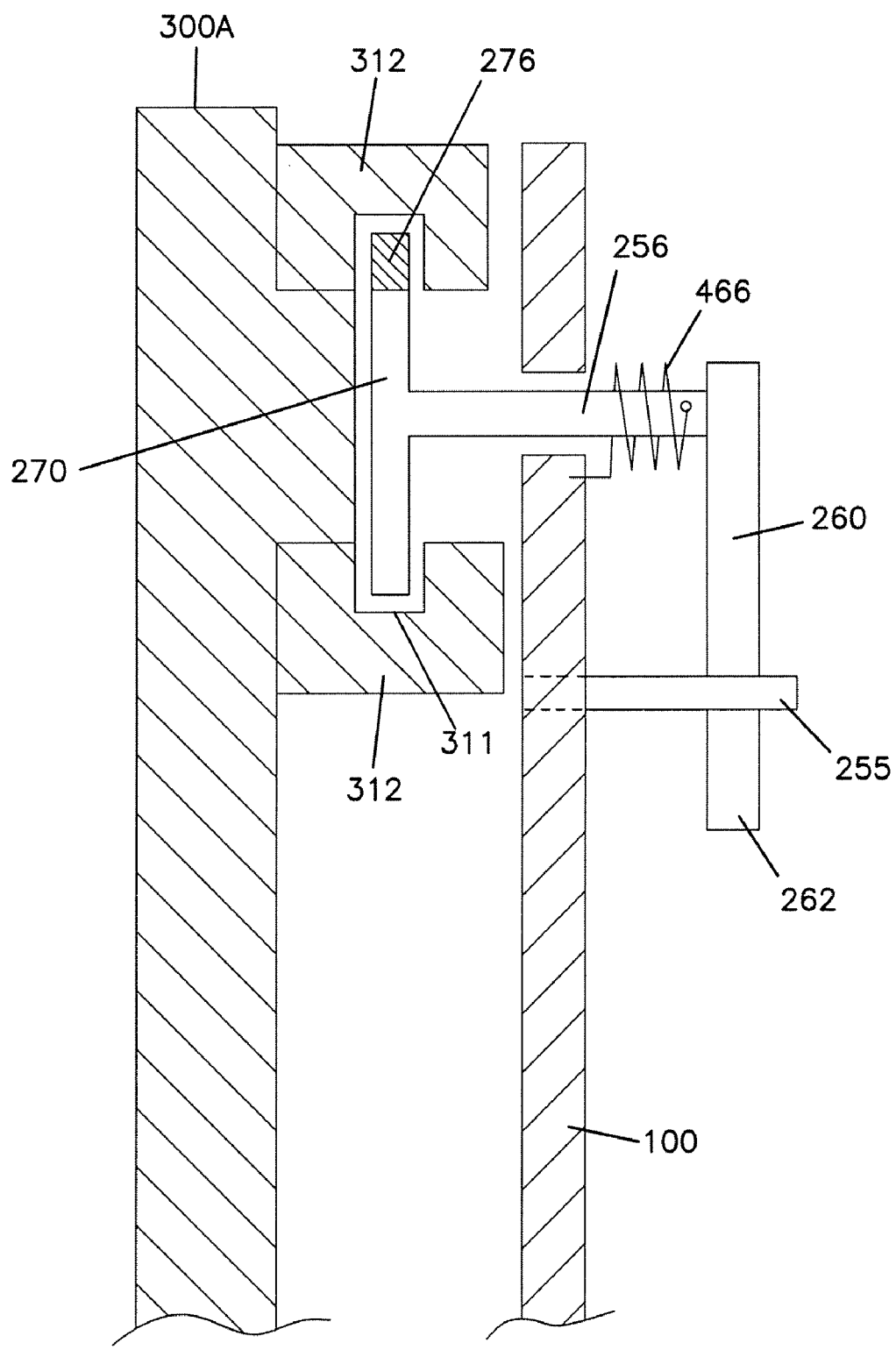
FIG. 10 is a cross-sectional view of the coupler and the trough member of FIG. 8.
Figure 11:
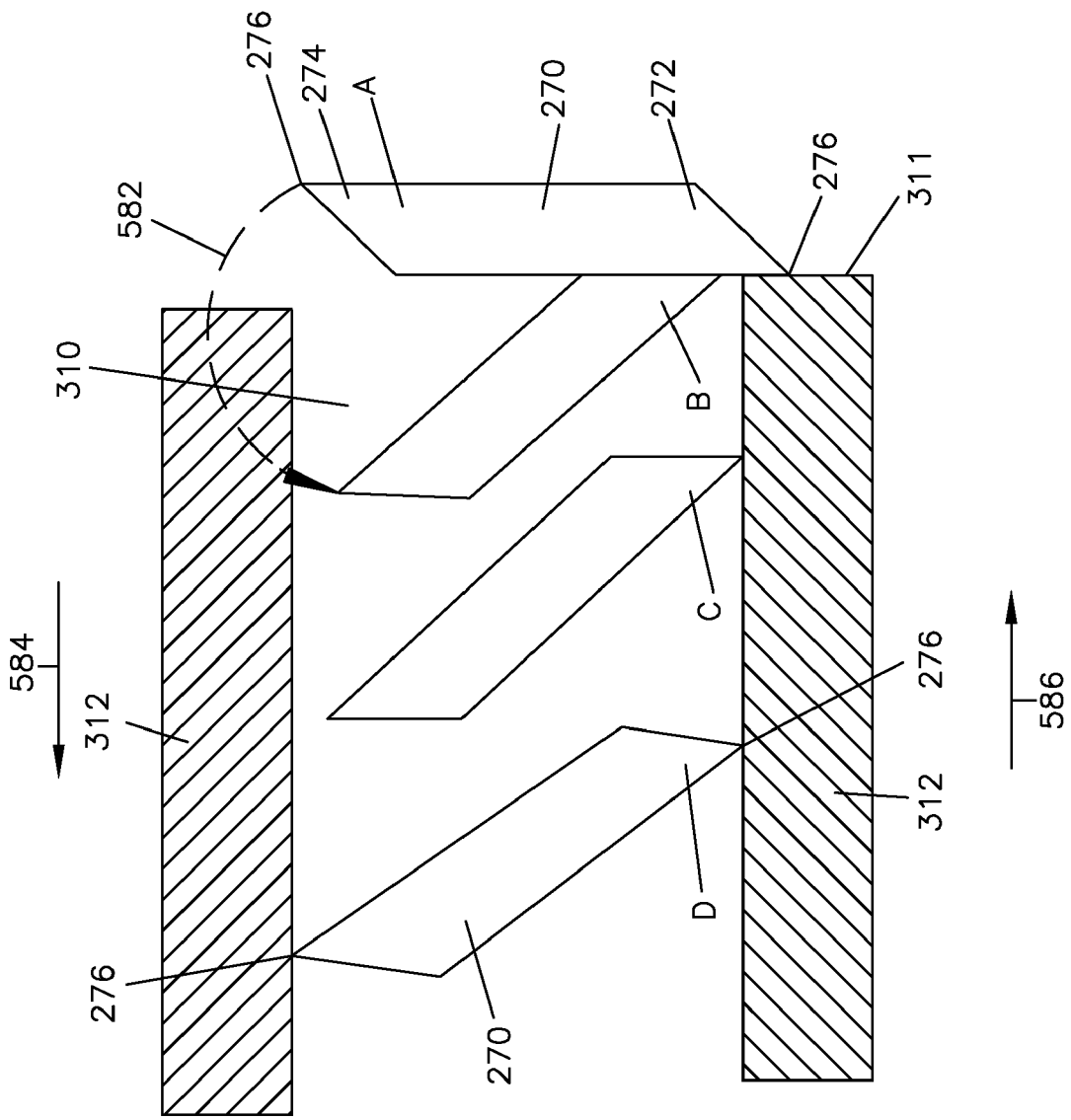
FIG. 11 is a cross-sectional view of a portion of the trough member and an embodiment of a locking element of the trough system of FIG. 8.
Figure 12:
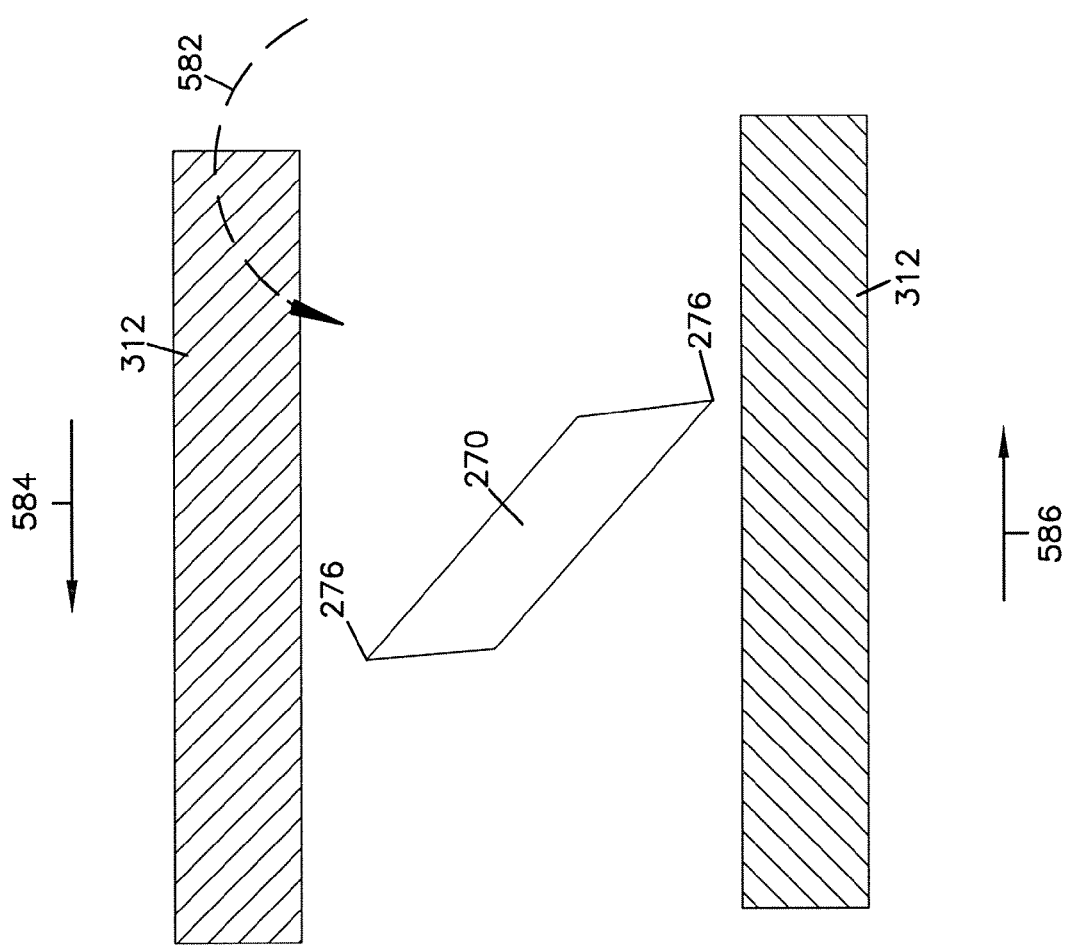
FIG. 12 is another cross-sectional view of a portion of the trough member and the locking element of the trough system of FIG. 9.

Referring now to FIGS. 9-11, as terminal end 302 of each trough member 300A is inserted into end 110 of the coupler 100 in a direction 584, pawl member 270 of locking element 107A (in the locked position) contacts and is introduced into slot 310 of trough member 300A. For example, as shown in FIG. 11, as pawl member 270 enters slot 310 (see position A), end 272 of pawl member 270 contacts an end surface 311 of wall 312 of slot 310. This contact causes pawl member 270 to rotate in a direction 582 against the force exerted by spring member 466.

In this position (see position B), pawl member 270 enters slot 310. Points 276 of ends 272, 274 of ride along walls 312 as pawl member 270 is inserted in direction 582 further into slot 310 (see positions C and D). When trough member 300A is fully inserted into coupler 100, pawl member 270 is inserted into slot 310 at position D. In this position, spring member 466 causes pawl member 270 to rotate slightly in a direction opposite to that of direction 582 so that points 276 of pawl member 270 engage walls 312 of slot 310 to resist movement of pawl member 270 in a direction 586 out of slot 310. In this manner, pawl member 270 couples coupler 100 to trough member 300A.

To remove trough member 300A from coupler 100, handle 260 of locking element 107A is rotated in direction 582 against spring member 466. Points 276 of pawl member 270 disengage walls 312 of slot 310. In this unlocked position, trough member 300A can be slid out of coupler 100 in direction 586 so that pawl member 270 exits slot 310.

Trough member 300B can be coupled to the opposite end of coupler 100 in a similar manner. The other locking elements 107B, 107C, 107D, 107E, 107F, 107G, 107H function in a manner similar to that of locking element 107A. In example embodiments, each locking element 107A, 107B, 107C, 107D, 107E, 107F, 107G, 107H can be moved from the locked to the unlocked position so that either of trough members 300A, 300B can be removed from coupler 100 without removing the opposite trough member. In addition, both trough members 300A, 300B can be removed at the same time.

IV. Method of Use

An example method for coupling one or both of trough members 300A, 300B to coupler 100 is as follows. Terminal end 302 of trough member 300A is inserted into spacing 103 of coupler 100 in direction 190. As trough member 300A is inserted into coupler 100, points 276 of members 270 of locking elements 107A, 107E, 107F, 107H contact and ride with walls 312 of slots 310 of trough member 300A. When trough member 300A is fully inserted into coupler 100, points 276 of members 270 engage walls 312 to resist movement of trough member 300A out of coupler 100. Trough member 300B can be coupled to second coupler end 111 of coupler 100 in a similar manner.

An example method of removing trough member 300A includes rotating handle members 260 of locking elements 107A, 107E, 107F, 107H against spring members 466 so that points 276 of members 270 disengage walls 312 of slots 310. Once points 276 disengage walls 312, trough member 300A can be removed from spacing 103 of coupler 100. Trough member 300B can be removed in a similar fashion. When handle members 260 are released, springs 466 move handle members 260 and members 270 back into the locked position so that handle members 260 contact respective pins 255.

In example embodiments, the locking elements disclosed herein are tool-less in that the locking elements do not require a separate tool to move the locking elements from the locked position to the unlocked position and vice versa. For example, in some embodiments, the locking elements can be moved from the locked position to the unlocked position through use of the user's hand.

In example embodiments, the locking elements disclosed herein are auto-locking, in that the locking elements can be placed in the locked position prior to insertion of the trough member into the coupler. When the trough member is introduced into the coupler, the locking elements automatically lock the trough member to the coupler. The locking elements can subsequently be moved to the unlocked position to release the trough member from the coupler.

Figure 13:
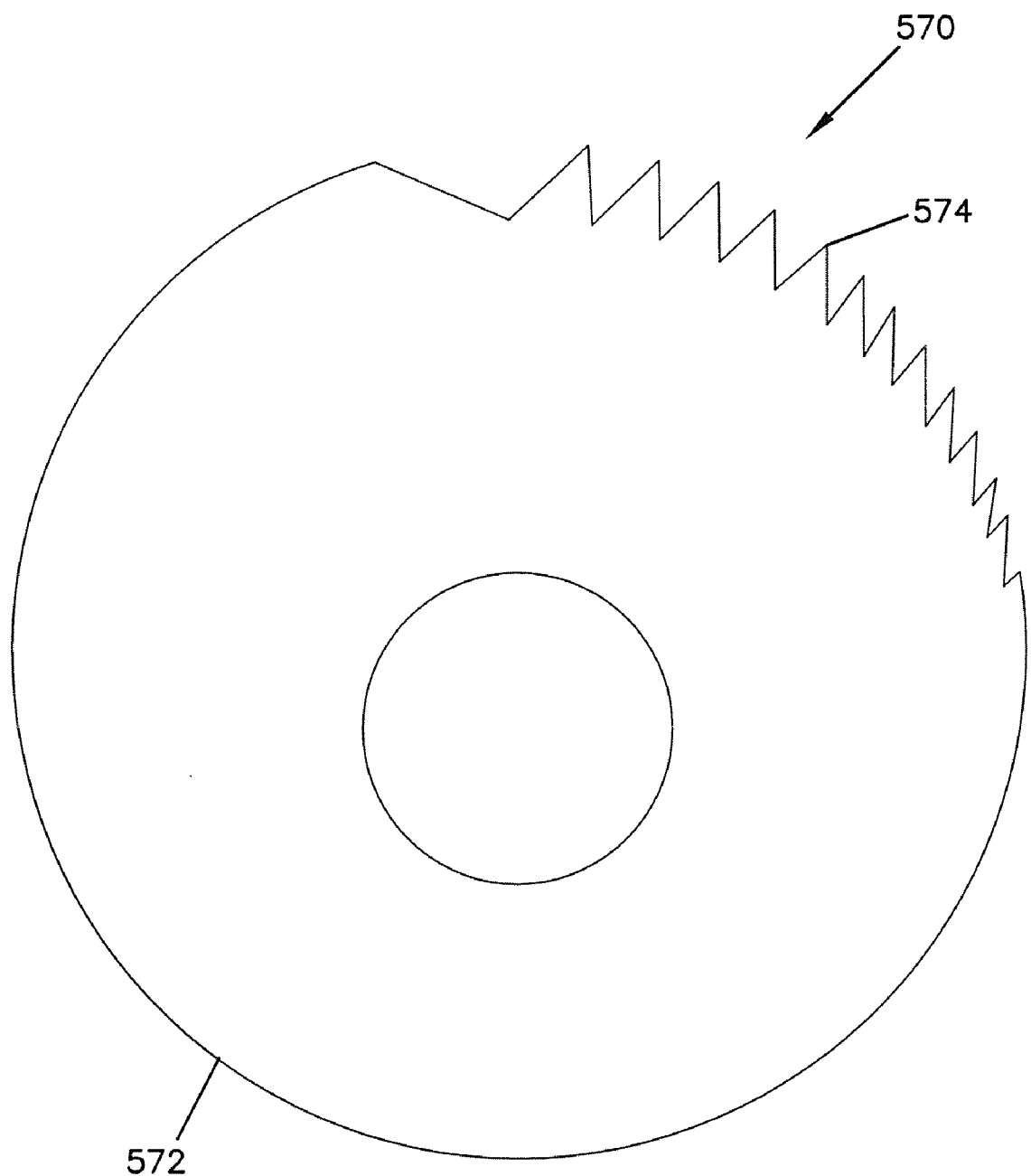
FIG. 13 is a side view of a portion of another embodiment of a locking element.

Alternative embodiments to those provided herein are also possible. For example, referring now to FIG. 13, in one alternative embodiment, pawl member 270 is replaced by a cam member 570 that is shaped in the form of a circle or oval. An outer circumference of cam member 570 includes a smooth portion 572 and teeth 574. Cam member 570 can be positioned so that smooth portion 572 contacts walls 312 of slot 310 when cam member 570 is introduced into slot 310. Cam member 570 can then be rotated so that teeth 574 engage walls 312 to resist movement of cam member 570 out of slot 310. To release, cam member 570 can again be rotated so that smooth portion 572 contacts walls 312 to allow cam member 570 to be slid out of slot 310.

In other alternative embodiments, a coupler can be configured to be coupled to more than two trough members, therefore including more than the first and second coupler ends. Further, a greater number of locking elements and/or clips can be presented for each coupler end, or, alternatively, fewer locking elements such as, for example, two on opposing sides, can be used.

The above specification, examples and data provide a complete description of the manufacture and of the invention.

Since many embodiments of the invention can be made without departing from the spirit and scope of the disclosure, the invention resides in the claims hereinafter appended.

What is claimed is:

1. A coupler for a cable trough system, the coupler comprising:
   a body including a bottom wall and two side walls defining a trough, the body having a body terminal end defining an overlap region, the overlap region being sized to slideably receive a terminal end of a trough member along a longitudinal direction of the body; and
   a locking element coupled to the body, the locking element including a main body defining an aperture, a shaft extending through the aperture of the main body, the shaft being rotatable with respect to the main body, a handle member coupled to a first end of the shaft, a member coupled to a second end of the shaft, and a spring coupled to the main body, the spring rotating the shaft and the member into a locked position.

2. The coupler of claim 1, wherein the member is a pawl member.

3. The coupler of claim 1, wherein the member is a cam member.

4. A cable trough system, comprising:
   a trough member including an exterior surface defining a slot extending in a longitudinal direction along the exterior surface; and
   a coupler including a body including a bottom wall and two side walls defining a trough, the body having a body terminal end defining an overlap region, the overlap region being sized to slideably receive a terminal end of the trough member along a longitudinal direction of the body, and the coupler including a locking element including a main body, a shaft extending through the main body, a handle member coupled to a first end of the shaft, and a member coupled to a second end of the shaft;
   wherein, as the trough member is inserted into the coupler, the member is inserted in the slot of the trough member, and wherein when the trough member is fully inserted into the coupler, the member rotates in a first direction to engage the slot to couple the trough member to the coupler.

5. The coupler of claim 4, wherein the member is a pawl member.

6. The coupler of claim 4, wherein the member is a cam member.

7. The system of claim 4, wherein, when the member is rotated in a second direction opposite to that of the first direction, the member disengages the slot and the trough member can be removed from the coupler.

8. The system of claim 4, wherein the member is a parallelogram including points that engage walls of the slot of the trough member.

9. The system of claim 4, further comprising a spring coupled to the locking element to move the member into a locked position.

10. The system of claim 9, wherein the handle member is rotated in a second direction opposite to that of the first direction to move the member into an unlocked position.

11. The system of claim 4, wherein the trough member defines a plurality of slots, and wherein the coupler includes a plurality of locking elements to correspond to the plurality of slots.

12. A method for coupling a coupler to a trough member, the method comprising:

sliding the trough member into the coupler so that a member of a locking element on the coupler is inserted into a slot defined by the trough member, the locking element including a main body, a shaft extending through the main body, a handle member coupled to a first end of the shaft, and the member coupled to a second end of the shaft; and when the trough member is fully inserted into the coupler, allowing a spring member of the locking element to rotate the member into a locked position so that ends of the member engage the slot to resist movement of the trough member out of the coupler.

13. The method of claim 12, further comprising:

rotating the handle of the locking element against the force of the spring member to rotate the member into an unlocked position such that the ends of the member disengage the slot; and removing the trough member from the coupler.

14. The method of claim 13, further comprising releasing the handle member so that the spring member moves the member into the locked position.

* * * * *